US008463231B1

(12) United States Patent
Williams

(10) Patent No.: US 8,463,231 B1
(45) Date of Patent: Jun. 11, 2013

(54) USE OF RADIUS IN UMTS TO PERFORM ACCOUNTING FUNCTIONS

(75) Inventor: Andrew Williams, Swindon (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/626,582

(22) Filed: Jul. 27, 2000

Related U.S. Application Data

(63) Continuation-in-part of application No. 09/626,699, filed on Jul. 27, 2000, now Pat. No. 8,117,291, and a continuation-in-part of application No. 09/626,700, filed on Jul. 27, 2000, which is a continuation-in-part of application No. 09/432,824, filed on Nov. 2, 1999, now Pat. No. 6,865,169.

(51) Int. Cl.
*H04M 11/00* (2006.01)

(52) U.S. Cl.
USPC ........... 455/405; 709/223; 709/224; 709/225; 709/226; 455/406; 455/408

(58) Field of Classification Search
USPC .......... 709/212–213, 223–226, 238; 455/433, 455/405–408; 370/345, 352, 469
See application file for complete search history.

(56) References Cited

U.S. PATENT DOCUMENTS

| | | | |
|---|---|---|---|
| 4,593,155 A | 6/1986 | Hawkins | |
| 5,442,625 A | 8/1995 | Gitlin et al. | |
| 5,610,841 A | 3/1997 | Tanaka et al. | |
| 5,638,371 A | 6/1997 | Raychaudhuri et al. | |
| 5,684,791 A | 11/1997 | Raychaudhuri et al. | |
| 5,745,480 A | 4/1998 | Behtash et al. | |
| 5,889,958 A | 3/1999 | Willens | |
| 5,933,421 A | 8/1999 | Alamouti et al. | |
| 5,940,771 A | 8/1999 | Gollnick et al. | |
| 5,956,636 A | 9/1999 | Lipsit | |
| 5,999,812 A | 12/1999 | Himsworth | |
| 6,047,177 A | 4/2000 | Wickman | |
| 6,061,650 A | 5/2000 | Malkin et al. | |
| 6,064,879 A | 5/2000 | Fujiwara et al. | |
| 6,115,390 A | 9/2000 | Chuah | |

(Continued)

FOREIGN PATENT DOCUMENTS

| | | |
|---|---|---|
| EP | 0487534 | 1/1992 |
| EP | 0817518 | 1/1998 |

(Continued)

OTHER PUBLICATIONS

Rigney, C., RADIUS Accounting, RFC 2059, Jan. 1997, pp. 1-22, http://www.ietf.org/rfc/rfc2059.txt?number=2059.*

(Continued)

*Primary Examiner* — Gregory Todd

(57) ABSTRACT

A wireless access network system comprises a RADIUS (Remote Access Dial-In User System) arrangement with an associated RADIUS accounting function. The RADIUS arrangement is arranged to track access activity by a user accessing the network via wireless user equipment and via the RADIUS arrangement. The access activity is recorded in an accounting database which is associated with the RADIUS accounting function. The wireless access system also comprises a radio network controller which comprises a RADIUS client. The RADIUS arrangement is arranged to receive information from a radio network controller of the system in order to track the access activity. The Invention is applicable to cellular communication systems such as UMTS (Universal Mobile Telecommunication System).

19 Claims, 2 Drawing Sheets

U.S. PATENT DOCUMENTS

| | | | |
|---|---|---|---|
| 6,119,160 A | 9/2000 | Zhang et al. | |
| 6,144,849 A | 11/2000 | Nodoushani et al. | |
| 6,151,628 A * | 11/2000 | Xu et al. | 709/225 |
| 6,157,829 A | 12/2000 | Grube et al. | |
| 6,188,899 B1 | 2/2001 | Chatterjee et al. | |
| 6,192,242 B1 | 2/2001 | Rollender | |
| 6,198,920 B1 | 3/2001 | Doviak et al. | |
| 6,212,390 B1 | 4/2001 | Rune | |
| 6,243,372 B1 | 6/2001 | Petch et al. | |
| 6,243,866 B1 | 6/2001 | Rudolph et al. | |
| 6,272,129 B1 | 8/2001 | Dynarski et al. | |
| 6,295,291 B1 | 9/2001 | Larkins | |
| 6,308,069 B1 | 10/2001 | Freitag et al. | |
| 6,320,851 B1 | 11/2001 | Kim et al. | |
| 6,324,402 B1 | 11/2001 | Waugh et al. | |
| 6,334,057 B1 | 12/2001 | Malmgren et al. | |
| 6,351,458 B2 | 2/2002 | Miya et al. | |
| 6,370,384 B1 | 4/2002 | Komara | |
| 6,373,831 B1 | 4/2002 | Secord et al. | |
| 6,374,112 B1 | 4/2002 | Widegren et al. | |
| 6,377,955 B1 * | 4/2002 | Hartmann et al. | 709/225 |
| 6,381,454 B1 | 4/2002 | Tiedemann, Jr. et al. | |
| 6,393,408 B1 | 5/2002 | Mosher et al. | |
| 6,400,966 B1 | 6/2002 | Andersson et al. | |
| 6,404,755 B1 | 6/2002 | Schafer | |
| 6,421,714 B1 | 7/2002 | Rai et al. | |
| 6,453,414 B1 | 9/2002 | Ryu | |
| 6,466,556 B1 | 10/2002 | Boudreaux | |
| 6,490,445 B1 | 12/2002 | Holmes | |
| 6,490,667 B1 | 12/2002 | Ikeda | |
| 6,515,989 B1 * | 2/2003 | Ronneke | 370/389 |
| 6,519,461 B1 | 2/2003 | Andersson et al. | |
| 6,567,850 B1 * | 5/2003 | Freishtat et al. | 709/224 |
| 6,571,290 B2 | 5/2003 | Selgas et al. | |
| 6,574,211 B2 | 6/2003 | Padovani et al. | |
| 6,577,862 B1 | 6/2003 | Davidson et al. | |
| 6,577,874 B1 | 6/2003 | Dailey | |
| 6,587,433 B1 | 7/2003 | Borella et al. | |
| 6,587,684 B1 | 7/2003 | Hsu et al. | |
| 6,618,592 B1 | 9/2003 | Vilander et al. | |
| 6,628,671 B1 * | 9/2003 | Dynarski et al. | 370/469 |
| 6,628,934 B2 | 9/2003 | Rosenberg et al. | |
| 6,628,942 B1 | 9/2003 | Beming et al. | |
| 6,636,894 B1 | 10/2003 | Short et al. | |
| 6,665,718 B1 | 12/2003 | Chuah et al. | |
| 6,675,208 B1 | 1/2004 | Rai et al. | |
| 6,681,099 B1 * | 1/2004 | Keranen et al. | 455/67.16 |
| 6,687,252 B1 | 2/2004 | Bertrand et al. | |
| 6,714,931 B1 * | 3/2004 | Papierniak et al. | 709/230 |
| 6,718,332 B1 * | 4/2004 | Sitaraman et al. | 709/246 |
| 6,728,884 B1 | 4/2004 | Lim | |
| 6,760,303 B1 | 7/2004 | Brouwer et al. | |
| 6,760,416 B1 | 7/2004 | Banks et al. | |
| 6,785,823 B1 | 8/2004 | Abrol et al. | |
| 6,804,720 B1 | 10/2004 | Vilander et al. | |
| 6,826,166 B2 | 11/2004 | Yokoyama | |
| 6,839,339 B1 | 1/2005 | Chuah | |
| 6,853,630 B1 * | 2/2005 | Manning | 370/338 |
| 6,865,169 B1 * | 3/2005 | Quayle et al. | 370/335 |
| 6,873,609 B1 | 3/2005 | Jones et al. | |
| 6,879,832 B1 | 4/2005 | Palm et al. | |
| 6,894,994 B1 * | 5/2005 | Grob et al. | 370/335 |
| 6,917,617 B2 | 7/2005 | Jin et al. | |
| 6,920,559 B1 | 7/2005 | Nessett et al. | |
| 6,980,515 B1 | 12/2005 | Schunk et al. | |
| 7,065,340 B1 | 6/2006 | Einola et al. | |
| 7,076,240 B2 | 7/2006 | Holmes | |
| 7,079,499 B1 * | 7/2006 | Akhtar et al. | 370/310 |
| 7,149,229 B1 * | 12/2006 | Leung | 370/466 |
| 7,327,757 B2 | 2/2008 | Ghahremani et al. | |
| 7,346,043 B1 | 3/2008 | Olshanky et al. | |
| 7,373,151 B1 | 5/2008 | Ahmed | |
| 7,408,940 B2 | 8/2008 | Jin et al. | |
| 7,412,528 B2 * | 8/2008 | Mir et al. | 709/230 |
| 7,676,556 B2 | 3/2010 | Goldstein | |
| 7,797,236 B1 * | 9/2010 | Liu et al. | 705/40 |
| 7,840,458 B2 * | 11/2010 | Liu et al. | 705/32 |
| 8,073,386 B2 | 12/2011 | Pedersen | |
| 2001/0001268 A1 * | 5/2001 | Menon et al. | 370/329 |
| 2002/0010683 A1 | 1/2002 | Aune | |
| 2002/0068612 A1 | 6/2002 | Carey et al. | |

FOREIGN PATENT DOCUMENTS

| | | |
|---|---|---|
| EP | 0918417 | 10/1998 |
| EP | 0917328 | 5/1999 |
| EP | 0986222 | 8/1999 |
| GB | 2348778 | 4/1999 |
| JP | 10243120 | 9/1998 |
| JP | 11098254 | 4/1999 |
| WO | WO-9901969 | 1/1909 |
| WO | WO-0000904 | 1/2000 |
| WO | WO 00/08803 | 2/2000 |
| WO | WO 0008803 A1 * | 2/2000 |
| WO | WO-00/25475 A1 | 5/2000 |
| WO | WO 00/38391 | 6/2000 |
| WO | WO-0044148 | 7/2000 |
| WO | WO-0046963 | 8/2000 |
| WO | WO-0128168 | 4/2001 |
| WO | WO-0131843 | 5/2001 |
| WO | WO-0141470 | 6/2001 |
| WO | WO-0167716 | 9/2001 |
| WO | WO-0169858 | 9/2001 |
| WO | WO-0187706 | 9/2001 |
| WO | WO-0197060 | 12/2001 |
| WO | WO-0211467 | 2/2002 |
| WO | WO 02/41597 A2 | 5/2002 |

OTHER PUBLICATIONS

Rigney, C., RADIUS Accounting, RFC 2139, Jun. 2000, pp. 1-25, http://www.ietf.org/rfc/rfc2866.txt?number=2866.*

Rigney et al., Radius, RFC 2138, Apr. 1997, pp. 1-22, http://www.ietf.org/rfc/rfc2138.txt?number=2138.

RFC:2604, Wireless Device Configuration (OTASP?OTAPA) via ACAP, Jun. 1999.

3rd Generation Partnership Project 2 "3GPP2". (Jul. 1999). "Physical Layer Standard for cdma2000 Spread Spectrum Systems," 3GPP2 C.S0002-0 Version 1.0, 369 pages.

Bender, P. et al. (Jul. 2000). "CDMA/HDR: A Bandwidth-Efficient High-Speed Wireless Data Service for Nomadic Users," *IEEE Communications Magazine*, pp. 70-77.

Ekstein, R. et al. (Apr.). "AAA Protocols: Comparison Between Radius, Diameter and Cops," AAA Working Group, Internet-Draft, located at <http://tools.ietf.org/html/draft-ekstein-aaa-protcomp-00> visited on Sep. 12, 2007. (29 pages).

Great Britain Examination Report mailed May 13, 2003, for GB 0118393.8, 3 pages.

Great Britain Examination Report mailed May 7, 2003, for GB 0118392.0, 3 pages.

Great Britain Search Report mailed Mar. 18, 2002, for GB 0118391.2, 3 pages.

Great Britain Search Report mailed Mar. 18, 2002, for GB 0118392.0, 3 pages.

Great Britain Search Report mailed Mar. 18, 2002, for GB 0118393.8, 3 pages.

Great Britain Search Report mailed May 14, 2002, for GB 0127567.6, 2 pages.

Qualcomm. (Oct. 2006). "Commonalities Between CDMA2000 and WCDMA Technologies," Qualcomm Incorporated, pp. 1-46.

Tsg Ran. (Jul. 6-7, 1999). "Liaison from ITU-R TG 8/1 on the Approval of Recommendation IMT.RSPC and on the Provision of Relevant Information from External Organizations," 3GPP/PCG Meeting #2, 3GPP/PCG#2(99)5, 58 pages.

U.S. Appl. No. 09/626,699, filed Jul. 27, 2000 for Jones et al.

U.S. Appl. No. 09/626,700, filed Jul. 27, 2000 for Jones et al.

U.S. Appl. No. 11/510,861, filed Aug. 25, 2006 for Quayle et al.

Translation of Japanese Final Rejection Dated Feb. 15, 2011 from Japanese Patent Application No. 2002-515859.

Japanese Office Action (with partial translation) dated May 19, 2011 from Japanese Patent Application No. 2002-515857.

Japanese Office Action (with translation) dated May 19, 2011 from Japanese Patent Application No. 2002-515857.

Japanese Patent Laid-Open No. 11-98254 published Apr. 9, 1999 with translation of abstract.

Dahlman, Erik et al. (Nov. 1998) "WCDMA—The Radio Interface for Future Mobile Multimedia Communications," IEEE Transactions on Vehicular Technology, 47(4); 1105-1118.

Search Report mailed Mar. 18, 2002, for GB Application No. GB 0118392.0 filed Jul. 27, 2001, three pages.

Examination Report mailed May 7, 2003, for GB Application No. GB 0118392.0 filed Jul. 27, 2001, three pages.

GB Search Report maned Mar. 18, 2009 for GB Application No. GB 0118383.8 filed Jul. 27, 2001, 3 pages.

* cited by examiner

USE OF RADIUS IN UMTS TO PERFORM ACCOUNTING FUNCTIONS

RELATED APPLICATIONS

This is a continuation-in-part of application Ser. No. 09/626,699, filed Jul. 27, 2000 now U.S. Pat. No. 8,117,291, entitled "USE OF INTERNET WEB TECHNOLOGY TO REGISTER WIRELESS ACCESS CUSTOMERS," and application Ser. No. 09/626,700, filed Jul. 27, 2000, entitled "USE OF RADIUS IN UMTS TO PERFORM HLR FUNCTION AND FOR ROAMING," which are continuations-in-part of application Ser. No. 09/432,824, filed Nov. 2, 1999, entitled "CELLULAR WIRELESS INTERNET ACCESS SYSTEM USING SPREAD SPECTRUM AND INTERNET PROTOCOL (IP)."

INTRODUCTION

The present invention is directed to the use of the Internet web technology to perform accounting functions in a wireless Internet access network.

BACKGROUND OF THE INVENTION

1. Field of the Invention

The present invention relates to a method and a system for performing accounting functions in a wireless Internet access network using Internet web technology.

2. Description of the Related Art

As disclosed in application Ser. No. 09/432,824 of Nov. 2, 1999 entitled CELLULAR WIRE INTERNET ACCESS SYSTEM USING SPREAD SPECTRUM AND INTERNET PROTOCOL (IP), this describes a cellular wireless Internet access system which operates in the 2 gigahertz or other frequency bands to provide high data rates to fixed and portable wireless Internet devices. Such users connect to near-by base stations which in turn communicate to Integrated Network Controllers which are then connected to the Internet. Such wireless implementation relates to an access network of the UMTS (Universal Mobile Telephone Service) type and its subset UTRAN (Universal Terrestrial Radio Access Network) standards. UMTS/UTRAN standards are published by the 3G Project Partnership (3GPP), www.3gpp.org.

In any telecommunication access system, be it wired or wireless, there must be some type of centralized accounting for recording customer's usage and for billing purposes. Where the access to the Internet is via the Public Switched Telephone Network (PSTN), a RADIUS system supports such accounting function. A description of RADIUS is provided by an article, RFC2138 Remote Authentication Dial-In User Service (RADIUS) by C. Rigney, et al., April 1997, which is available at the website www.ietf.org. Thus far, this system, however, has only been used for a Public Switched Telephone Network access.

Traditional mobile communications technology generating accounting information for Internet service may not satisfactorily support all aspects of the wireless access system describe in the above co-pending application Ser. No. 09/432,824.

There is therefore a need for allowing performance of accounting functions in a wireless access system in which the above disadvantages may be alleviated.

SUMMARY OF INVENTION

In accordance with a first aspect of the invention there is provided a method of operation in a wireless access network system.

In accordance with a second aspect of the invention there is provided a wireless access network system.

In accordance with a third aspect of the invention there is provided a RADIUS arrangement for use in a wireless access network system.

In accordance with a fourth aspect of the invention there is provided a network controller for use in a wireless access network system.

In accordance with a fifth aspect of the invention there is provided a computer program element comprising computer program means for performing the method of operation in a wireless access network system.

In a preferred form of the invention, there is provided a method of operating a cellular wireless Internet access system using RADIUS (Remote Authentication Dial-In User Service) which is normally used for authentication and accounting for dial-up Internet access over the PSTN (Public Switched Telephone Network) where the user utilizes a portable subscriber terminal with a directly attached antenna for communicating in a wireless manner via a cellular network with an integrated network controller and then to a target Internet Service Provider (ISP), comprising the steps in conjunction with a wireless Internet access network operator providing a RADIUS accounting function within its RADIUS server. A subscriber terminal is linked via a wireless network to an Integrated Network Controller for negotiating access with a RADIUS server. If a confirmation of access is approved by the RADIUS server, the subscriber is permitted to connect to the Internet and the radius accounting function in the RADIUS server tracks the connect time of the subscriber terminal to the network, volume of data transmitted, a record of connection of the subscriber terminal, and other details relating to the subscriber session in an accounting data base connected with said RADIUS server. Disconnection is recorded when the subscriber terminal disconnects from the wireless network.

DETAILED DESCRIPTION OF PREFERRED EMBODIMENT

Figure 1:
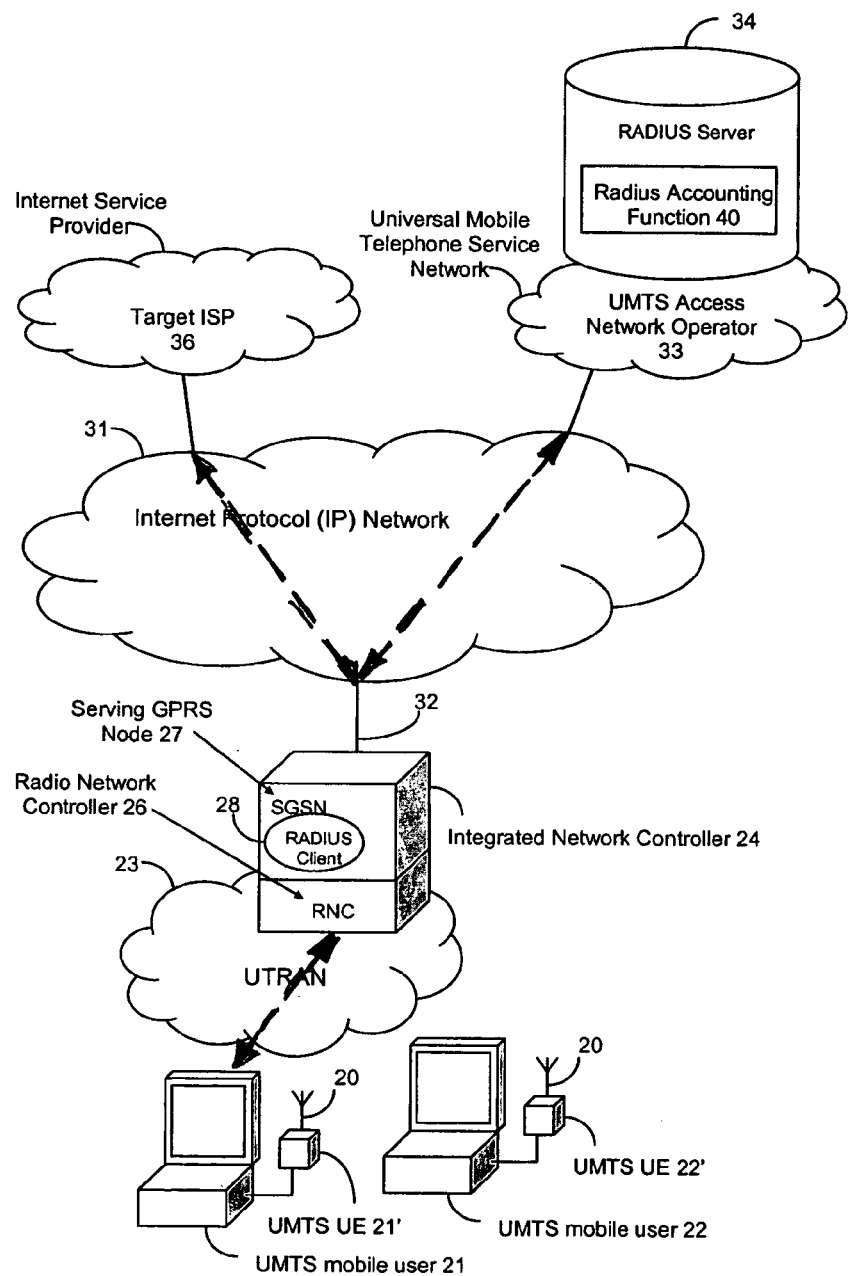
FIG. 1 is a block diagram of an Internet system illustrating the present invention.

Referring now to FIG. 1, two typical users of the Internet access system are illustrated at 21 and 22. Each wireless access user has a personal computer PC and UMTS user equipment (UE) 21' and 22' with a directly attached antenna 20 is connected by typical data connection such as an RS232, USB or Internet to the PC. The user equipment is termed a portable subscriber terminal, operating in conjunction with its associated PC.

The wireless access user is described in the above co-pending application as a part of a UMTS/UTRAN system, the technique being described in the above co-pending application, which communicates in a wireless manner, via a UTRAN network 23, to an integrated network controller (INC) 24. Such controller may be connected by wire or otherwise to an Internet system or web 31. As discussed in the above co-pending application, the controller 24 includes an RNC or Radio Network Controller 26, which controls and allocates the radio network resources and provides reliable delivery of user traffic between a base station and subscriber terminal. An SGSN (Serving General Packet Radio Service Node) 27 provides session control. Lastly, a RADIUS element designated RADIUS client 28 is incorporated to provide authentication and accounting. The Internet protocol network 31 is connected to INC 24 by an Internet protocol connection 32 and then to a UMTS access network operator 35 having a RADIUS server 34 incorporating an accounting function 40. There is also a designated target ISP 36. From an overall viewpoint, the RADIUS accounting function 40, which supports wireless access network accounting, replaces the conventional accounting functions and associated protocols as normally used on cellular mobile networks based on the UMTS/UTRAN standards.

Once a user has established an access network session, accounting information related to that session is recorded by the RADIUS client 28 within the SGSN 27. Per session accounting information comprises information on connect time, volume of data sent and received by the mobile user, and also other information relating to the subscriber and the ISP to which he is connected. This information is sent to the RADIUS accounting function 40 within the RADIUS server 34 using standard RADIUS accounting messages.

It will, of course, be appreciated that the accounting functions discussed above will typically be carried out in computer programs or routines in software (like other system functions) running on processors (not shown).

Figure 2:
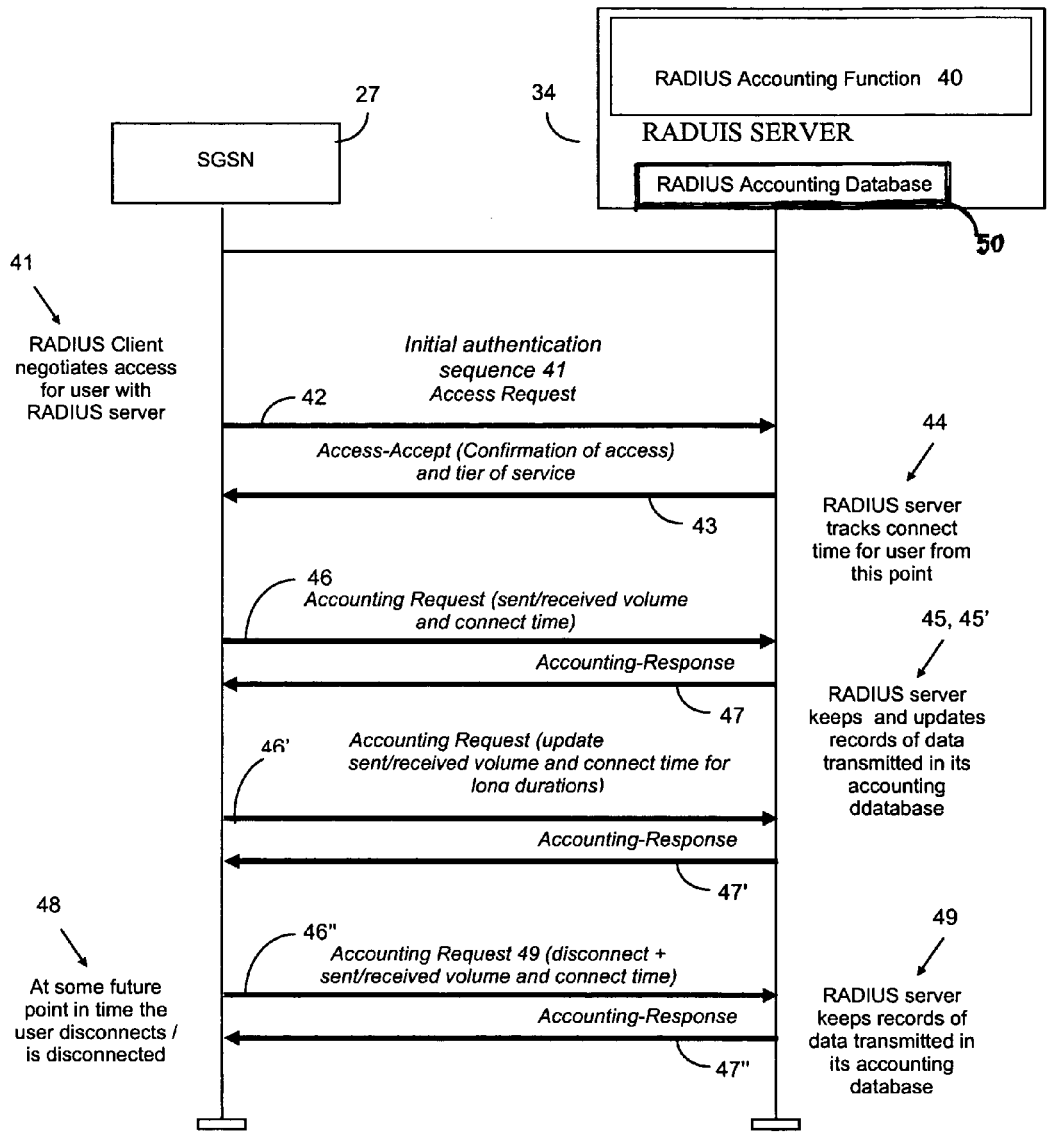
FIG. 2 is a diagram illustrating the method of the present invention.

FIG. 2 illustrates the above which shows the communication between the RADIUS client 28 in the SGSN 27 and the RADIUS accounting function 40. In the initial authentication sequence 41, RADIUS client 28 negotiates access for the subscriber 21 or 22 with the RADIUS server 34 as indicated by the arrow 42. If there is confirmation of access and tier of service indicated by arrow 43, the RADIUS server then at step 44 tracks the connect time for the user from this point. Then an accounting request in step 45, as shown by the arrow 46, is sent from the RADIUS client 28 to the RADIUS accounting function 40 and the RADIUS accounting function keeps records of data transmitted and other necessary information in its accounting database 50 (FIG. 2), and there is a response as shown by arrow 47. This may occur at repeated intervals 46', 46", 47' and 47" until a disconnect occurs as shown at step 48. Here the RADIUS server shown at step 49 keeps the disconnection record together with all other information gathered in the subscriber's session in its accounting database 50; thus, all of the necessary accounting functions are provided. Such accounting messages are forwarded to the RADIUS accounting function 40 at configurable intervals; the normal facilities of the RADIUS protocol for insuring reliable delivery are used. Thus this generates accounting records while the session is in progress and inherently is able to account for potentially very long duration Internet connection sessions while the sessions are in progress rather than (as opposed to the previous system) only after they are concluded. This is analogous to long duration call records in telephone system billing records. When a session is terminated, a final accounting message is sent to the RADIUS server to report the total connect time and total data sent and received for that wireless access network session. Accounting records thus generated are subsequently fed into a billing system to be reconciled and user billing produced.

Thus an improved accounting system for a wireless network has been provided.

Use of Radius in UMTS to Perform Accounting Functions

Internet web technology is used, and specifically a RADIUS (Remote Access Dial-In User System) server is used to keep records of connection time, data transmitted, session time and disconnection in a wireless access system.

What is claimed is:

1. A method for accounting, for an Integrated Network Controller (INC), related to a user equipment (UE) accessing the Internet through a Universal Mobile Telecommunications System (UMTS) access network, the method comprising:
   receiving from the UE, at the INC, a request for access to a target Internet Service Provider (ISP), the INC associated with a UMTS access network and comprising a Radio Network Controller (RNC), a Serving GPRS Service Node (SGSN), and a RADIUS client that is operable for communicating with a RADIUS server over an internet protocol (IP) network, wherein the RADIUS client is within the UMTS access network and a RADIUS accounting function is associated with the RADIUS server;
   initiating UE access to the target ISP in response to receiving authentication at the RADIUS client from the RADIUS server via the IP network; and
   initiating tracking of access activity by the RADIUS server, wherein the access activity is stored in an accounting database associated with the RADIUS accounting function and a subscriber identification associated with the UE, and wherein the accounting database is updated at repeated intervals during a connection session between the user and the network until a disconnection occurs, and when a disconnection occurs receiving a final accounting message reporting a time and amount of data communicated during the session.

2. The method of claim 1, wherein the RADIUS client of the INC is operable for communicating with the RADIUS server using an IETF RFC 2138 protocol.

3. The method of claim 1, wherein the access activity includes a connection time of the UE with the target ISP.

4. The method of claim 1, wherein the access activity includes a volume of data received by the UE.

5. The method of claim 1, wherein the access activity includes a volume of data sent by the UE.

6. The method of claim 1, wherein the access activity stored in the accounting databases, associated with the subscriber identification, is further associated with an identification of the target ISP in the accounting database.

7. The method of claim 1, wherein the access activity includes information related to disconnection of the UE from the target ISP.

8. The method of claim 1, wherein the accounting database is updated upon UE disconnection.

9. The method of claim 1, wherein the accounting database is updated at predetermined intervals of time to thereby accommodate long duration connection sessions.

10. An accounting system for a Universal Mobile Telecommunications System (UMTS) access network related to a user equipment (UE) accessing the Internet, the system comprising:
   a processor;
   an integrated network controller (INC) comprising a Radio Network Controller (RNC), a Serving GPRS Service Node (SGSN), and a RADIUS client, for receiving from the UE a request for access to a target Internet Service Provider (ISP), wherein the INC is associated with a UMTS access network; and
   a RADIUS server for tracking of access information in response to the UE request to access the target ISP through the UMTS access network,
      wherein the RADIUS client is within the UMTS access network;

wherein a RADIUS accounting function is associated with the RADIUS server;

wherein the RADIUS client is operable for communicating with the RADIUS server over an internet protocol (IP) network, and wherein the INC is operable for initiating UE access to the target ISP in response to receiving authentication from the RADIUS server, and the tracking of access information, at the INC, by the RADIUS server, wherein the access information is stored in an accounting database associated with the RADIUS accounting function and a subscriber identification associated with the UE, and wherein the accounting database is updated at repeated intervals during a connection session between the UE and the network until a disconnection occurs, and when a disconnection occurs receiving a final accounting message reporting a time and amount of data communicated during the session.

11. The system of claim 10, wherein the RADIUS client of the INC is operable for communicating with the RADIUS server using an IETF RFC 2138 protocol.

12. The system of claim 10, wherein the access activity includes a connection time of the UE with the target ISP.

13. The system of claim 10, wherein the access activity includes a volume of data received by the UE.

14. The system of claim 10, wherein the access activity includes a volume of data sent by the UE.

15. The system of claim 10, wherein the access activity stored in the accounting databases, associated with the subscriber identification, is further associated with an identification of the target ISP in the accounting database.

16. The system of claim 10, wherein the access activity includes information related to disconnection of the UE from the target ISP.

17. The system of claim 10, wherein the accounting database is updated upon UE disconnection.

18. The system of claim 10, wherein the accounting database is updated at predetermined intervals of time to thereby accommodate long duration connection sessions.

19. A non-transitory computer-readable medium encoded with computer program instructions for performing a method for accounting, for an Integrated Network Controller (INC), related to a user equipment (UE) accessing the Internet through a Universal Mobile Telecommunications System (UMTS) access network, the method comprising:

receiving from the UE, at the INC, a request for access to a target Internet Service Provider (ISP), the INC associated with a UMTS access network and comprising a Radio Network Controller (RNC), a Serving GPRS Service Node (SGSN), and a RADIUS client operable for communicating with a RADIUS server over an internet protocol (IP) network, the RADIUS client within the UMTS access network, and wherein a RADIUS accounting function is associated with the RADIUS server;

initiating UE access to the target ISP in response to receiving authentication at the RADIUS client from the RADIUS server via the IP network; and initiating tracking of access activity by the RADIUS server, wherein the access activity is stored in an accounting database associated with the RADIUS accounting function and a subscriber identification associated with the UE, and wherein the accounting database is updated at repeated intervals during a connection session between the user and the network until a disconnection occurs, and when a disconnection occurs receiving a final accounting message reporting a time and amount of data communicated during the session.

* * * * *